(12) United States Patent
Jose et al.

(10) Patent No.: US 10,110,461 B2
(45) Date of Patent: Oct. 23, 2018

(54) SERVER GROUP AND GROUP MANAGER WITH SUPPORT FOR LOCATION-BASED OPERATIONS

(71) Applicant: Dell Products L.P., Round Rock, TX (US)

(72) Inventors: Cyril Jose, Austin, TX (US); Akkiah Choudary Maddukuri, Austin, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 15/141,579

(22) Filed: Apr. 28, 2016

(65) Prior Publication Data

US 2017/0317908 A1    Nov. 2, 2017

(51) Int. Cl.
H04L 12/26    (2006.01)
H04W 4/02    (2018.01)
H04W 4/08    (2009.01)
H04W 4/70    (2018.01)

(52) U.S. Cl.
CPC ............ *H04L 43/10* (2013.01); *H04W 4/023* (2013.01); *H04W 4/08* (2013.01); *H04W 4/70* (2018.02)

(58) Field of Classification Search
None
See application file for complete search history.

(56) References Cited

U.S. PATENT DOCUMENTS

| 7,937,167 | B1* | 5/2011 | Mesarina | H04W 8/186 340/870.11 |
|---|---|---|---|---|
| 2007/0060098 | A1* | 3/2007 | McCoy | G01S 5/0289 455/404.2 |
| 2010/0121602 | A1* | 5/2010 | Souilmi | H04B 17/21 702/104 |
| 2012/0311016 | A1* | 12/2012 | DeAnna | H04L 41/046 709/202 |
| 2014/0162711 | A1* | 6/2014 | Miller, II | H04W 4/006 455/500 |
| 2014/0184604 | A1* | 7/2014 | Bak | G06T 11/206 345/440 |
| 2015/0379408 | A1* | 12/2015 | Kapoor | G01W 1/10 706/46 |

(Continued)

*Primary Examiner* — Thomas J Dailey
(74) *Attorney, Agent, or Firm* — Jackson Walker L.L.P.

(57) ABSTRACT

A method of managing a server group comprising a plurality of group members in a server group may include receiving, from a group member, health status data and obtaining location data. The health status data may indicate a group member's status with respect to a health parameter. The set of health parameter states may include a compliant, borderline, and non-compliant state defined by one or more thresholds. The location information may indicate locations of the group members relative to one another. A status-location operation may be performed in accordance with the health status and location data to generate a display including, for each of the group members, a data point indicating a status for a particular health parameter and a location of the applicable group member relative to other group members. Historical status change data may be maintained and used to predict a next status change expected.

20 Claims, 6 Drawing Sheets

(56) References Cited

U.S. PATENT DOCUMENTS

2016/0037294 A1* 2/2016 Zhang .................... H04W 4/02
 455/456.1
2016/0256082 A1* 9/2016 Ely ...................... A61B 5/0024
2016/0330534 A1* 11/2016 White, Jr. ................ H04Q 9/00

* cited by examiner

| Ping Response Time | A | B | C |
|---|---|---|---|
| A | NA | 1ms | 2ms |
| B | 1ms | NA | 1ms |
| C | 2ms | 1ms | NA |

160

| BLE signal strength | A | B | C |
|---|---|---|---|
| A | NA | immediate | Near |
| B | immediate | NA | Near |
| C | near | Near | NA |

170

SERVER GROUP AND GROUP MANAGER WITH SUPPORT FOR LOCATION-BASED OPERATIONS

TECHNICAL FIELD

The present disclosure relates in general to information handling systems, and more particularly to systems and method for managing information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use including, as non-limiting examples, financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a special purpose controller, referred to as a management controller, for performing system management functions and an interface or analogous resources that enable a remotely located information handling system or resource to access the management controller.

Servers and other types of information handling systems may be configured as a server group that encompasses one or more data center floors on one or more floors of one or more buildings at a particular facility. Anecdotal evidence suggests that correlations between hardware problems and physical location are not uncommon, e.g., problems associated with environmental and/or electrical conditions present at a physical location. Typically, however, servers and other information handling systems, including servers for use in data centers and other densely configured applications and environments, lack resources configured to provide location based information or make location-based determinations.

SUMMARY

In accordance with the teachings of disclosed subject matter, disadvantages and problems associated with identifying location-dependent health parameters are addressed.

In accordance with embodiments of the present disclosure, information handling systems and methods for managing a group of servers or other information handling systems that include a plurality of group members in a server group may include receiving, from one or more group members, health status data and obtaining location data. The health status data may indicate a group member's status with respect to one or more health parameters. The set of states for any health parameter may include a compliant (green) state, a borderline (yellow) state, and a non-compliant (red) state defined by one or more threshold values. Other embodiments may include more or fewer states for any particular health parameter. The location information may indicate locations of the group members relative to one another.

A status-location operation may then be performed in accordance with the health status data and the location data. The status-location operation may convey or depend upon a relationship between the health status data and the location data. The status location operation may include generating a location-status display including, for each of the group members, a data point indicating a status for a particular health parameter and a location of the applicable group member relative to other group members.

Generating the location-status display may include accessing distance-proxy data, i.e., data indicative of member-pair distances, for a plurality of member-pairs. Each member-pair distance corresponds to a distance between a particular pair of group members. Distance-proxy data may include a ping response delay between two points, a wireless signal strength between two points, or the like. Distance proxy data for each permutation of member pairs for which distance-proxy data is available may then be compared to resolve relative distances among the group members. For example, by accessing and comparing distance-proxy data for three member-pairs, including a first member pair comprising first and second members, a second member pair comprising first and third members, and a third member pair comprising the second and third members, relative distances among the first, second, and third members may be resolved.

By iterating these operations across distance-proxy data for all available member-pairs, relative distances among each of the group members for which distance-proxy data is available may be determined.

Group snapshots indicative of the health status of the server group may be recorded from time to time and the system may monitor for status change events that occur when a health parameter of a group member changes from one state to another. When a status change event is detected, status change information corresponding to the event may be recorded. The status change information may include a state change indicator that indicates whether the state change event was a positive change or a negative change. From the current state of a server group and the historical status change information corresponding to past status change events, a next change of the status change indicator may be predicted using a decision tree methodology or another heuristic technique. Based on the next predicted status change indicator, a management operation, including proactive action, corrective action, or the like may be taken.

Health status data for health parameters may encompass any data obtainable from a sensor or derived from one or more sensed parameters. Sensors may include thermal sensors, environmental sensors including ambient humidity and ambient air pressure sensors, mechanical sensors including vibration sensors, accelerometers, gyroscopes, etc., optical sensors, audio sensors, and so forth. Disclosed systems and methods may maintain health status data for one or more electrical parameters including, as non-limiting examples, average, peak, and/or instantaneous power, current, voltage, impedance, and/or capacitance; and one or more thermal parameters including, as non-limiting examples, ambient air temperature, ambient device temperature, device junction temperature, or another suitable thermal parameter.

The location data may be received from any of various sources including, GPS sensors when available, user provided input for parameters including, as non-limiting examples, a group member's building, floor, room, aisle, rack, and so forth, information provided via a query, and the like. In at least one embodiment, location information includes link local proximity information obtained via a link local connection between two or more group members. Link local proximity information may include information indicative of a ping response time between two group members, a signal strength of a local wireless signal such as a Bluetooth low energy (BLE) signal or a WiFi signal from a wireless access point.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, all FIGUREs illustrate systems and method in accordance with disclosed subject matter unless expressly indicated otherwise, and wherein.

DETAILED DESCRIPTION

Figure 1:
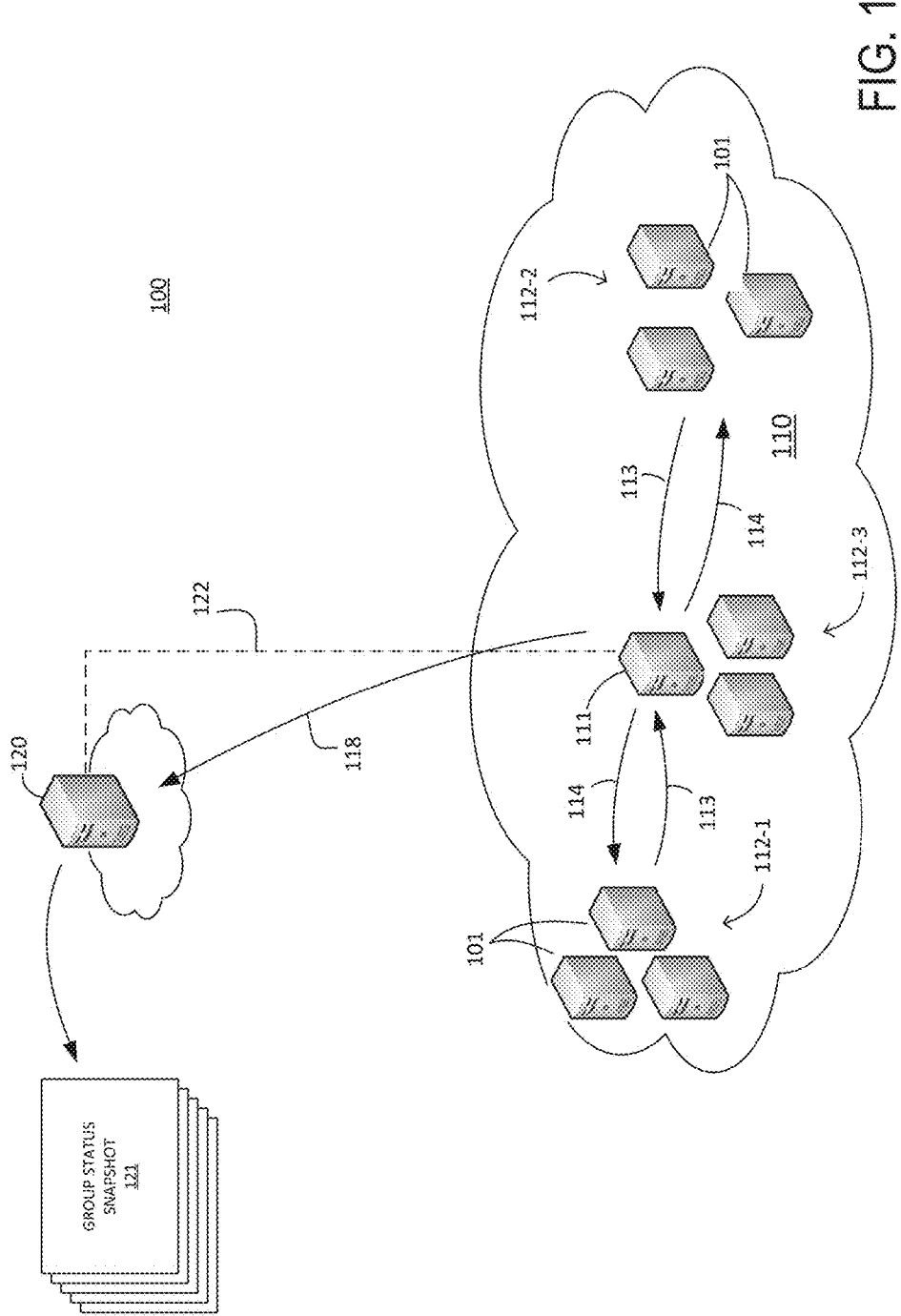
FIG. 1 illustrates an information handling system platform including a server group.

Preferred embodiments and their advantages are best understood by reference to FIGS. 1-9, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a server, a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation a general purpose processor or central processing unit, a service processor, a basic input/output system (BIOS), a bus, memory and other storage resources, I/O devices and/or interfaces, network interfaces, motherboards, and/or any other components and/or elements of an information handling system.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, WiFi, or other suitable standard), personal area networks (PAN) (e.g., BLUETOOTH and BLUETOOTH LOW ENERGY), local area Networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

For the purpose of this disclosure, "short-range wireless communications technology" refers to any suitable communications transport, protocol, and/or standard allowing two or more suitably-configured devices to communicate via wireless transmissions provided that such devices are within approximately one meter of each other. Examples of short-range communications technologies include, without limitation, BLUETOOTH Class 3, near field communication (NFC), radio frequency identification (RFID), proximity card, vicinity card, ISO 14443, WiFi, and ISO 15693.

FIG. 1 illustrates an information handling system platform 100 suitable for implementing a server group 110 and location-aware management of the server group 110. The server group 110 illustrated in FIG. 1 includes a plurality of information handling systems 101. Each information handling system 101 may represent a server or other suitable computer or system that includes a processor and a storage medium or memory in which executable instructions may be stored to enable one or more desired functions. Because the depicted platform 100 includes a server group 110, the information handling systems 101 may be referred to herein as group members 101 and/or group member servers 101.

The group members 101 of server group 110 illustrated in FIG. 1 are further arranged in smaller groups referred to herein as group segments 112, three of which are illustrated in FIG. 1. Group segments 112 may represent subsets of the group members 101 of server group 110. In at least one embodiment, group segments 112 may correspond to subsets of group members 101 that share a proximity characteristic in addition to proximity based on membership in server group 110.

While all of the group members 101 of server group 110 may be located in relatively close proximity to one another, group segments 112 may include group members 101 that are still closer to one another. For example, an entity may operate data centers in different locations and a server group 110 may include all servers associated with a particular data center at a particular location. The particular data center may span multiple buildings or multiple floors of a particular building and, in this example, a group segment 112 may include all of the servers in a particular building, all of the servers on a particular floor of a particular building, all of the servers in a particular raised floor room or partition, or some other subset of the data center. The servers in a particular group segment 112 may also share a functional proximity to one another. In at least one embodiment, as an example, group segments 112 may be defined by local links to which the servers are connected.

The group members 101 of server group 110 may be configured to sense or derive one or more operational parameters, sometimes referred to herein as health status parameters or health parameters. A group member 101 may make its sensed parameter data available to one or more other systems by responding to subscription requests indicating specific parameters and particular recipients of the applicable information.

The server group 110 illustrated in FIG. 1 includes a group manager 111. Group manager 111 may resemble other group members 101 of server group 110 in terms of its processing capacity, storage capacity, and/or I/O capacity, but group manager 111 may be configured to define the information handling systems 101 that form a server group 110. Group manager 111 may also receive health status data 113 from group members 101 and communicate group status data 118 to remote management resource 120, which may be implemented as a cloud-based resource, as depicted in FIG. 1, or a premises-based resource.

FIG. 1 illustrates a trust relationship 122 established between remote management resource 120 and group manager 111. Remote management resource 120 may provide console-driven access to server management resources for creating and applying hardware profiles to provision and deploy servers and software as needed. Remote management resource 120 may include features to obtain detailed information regarding a particular network deployment and utilities to facilitate server management tasks including server update tasks.

Group manager 111 may, either individually or in conjunction with remote management resource 120, generate group status snapshots 121 periodically or asynchronously, e.g., in response to health parameter status changes from one or more group members 101. Group status snapshots 121 may include information indicative of an instantaneous status of the group members 101 in server group 110 across one or more health parameters. Some embodiments may generate some or all group status snapshots 121 as differential snapshots indicating health status information whose state has changed since the previous group status snapshot. Group status snapshots 121 may be stored or otherwise preserved in a suitable storage resource, not explicitly depicted in FIG. 1. The storage resource may include storage within remote management server 120, storage within group manager 111 or network based or cloud based storage resources not depicted.

FIG. 1 illustrates group manager 111 subscribing (114) to receive health parameter information pushed from the applicable group member 101. Health parameters that group manager 111 may subscribe to receive from group members 101 may include as non-limiting examples, thermal parameters, electrical parameters, and functional parameters.

In some embodiments, health data communicated to group manager 111 may be raw or analog data, e.g., ambient chassis temperature (° C.) or average power consumption (W) over a given interval. In other embodiments, health data may be communicated as status data indicating one of a limited number of states for the applicable parameter(s) where the states are typically associated with one or more threshold values. To illustrate, some embodiments may employ three states for each health parameter. The three states may include a normal state, a borderline state, and a non-compliant or out-of-limit state. The three states may be associated with the green, yellow, and red colors of a conventional traffic signal to convey their respective meanings. The normal (GREEN) state may indicate normal operating conditions currently causing no concern, a borderline (YELLOW) state may indicate a non-critical warning, while an out-of-limit (RED) state may signal a problem warranting immediate corrective action.

As suggested previously, group members 101 of server group 110 may have a first degree of proximity while the group members in a group segment 112 may share a second and greater degree of proximity. For example, the group members 101 within a group segment 112 may share "link level" proximity. Link level proximity may include the proximity shared between two devices on the same local link of a particular network or sub network. Link level proximity may be shared among group members 101 coupled to a common local area network (not specifically depicted in FIG. 1). Similarly, link level proximity may be shared by all group members 101 communicating with a common wireless access point or communicating with a common device via Bluetooth or Wi-Fi as examples.

Figure 2:
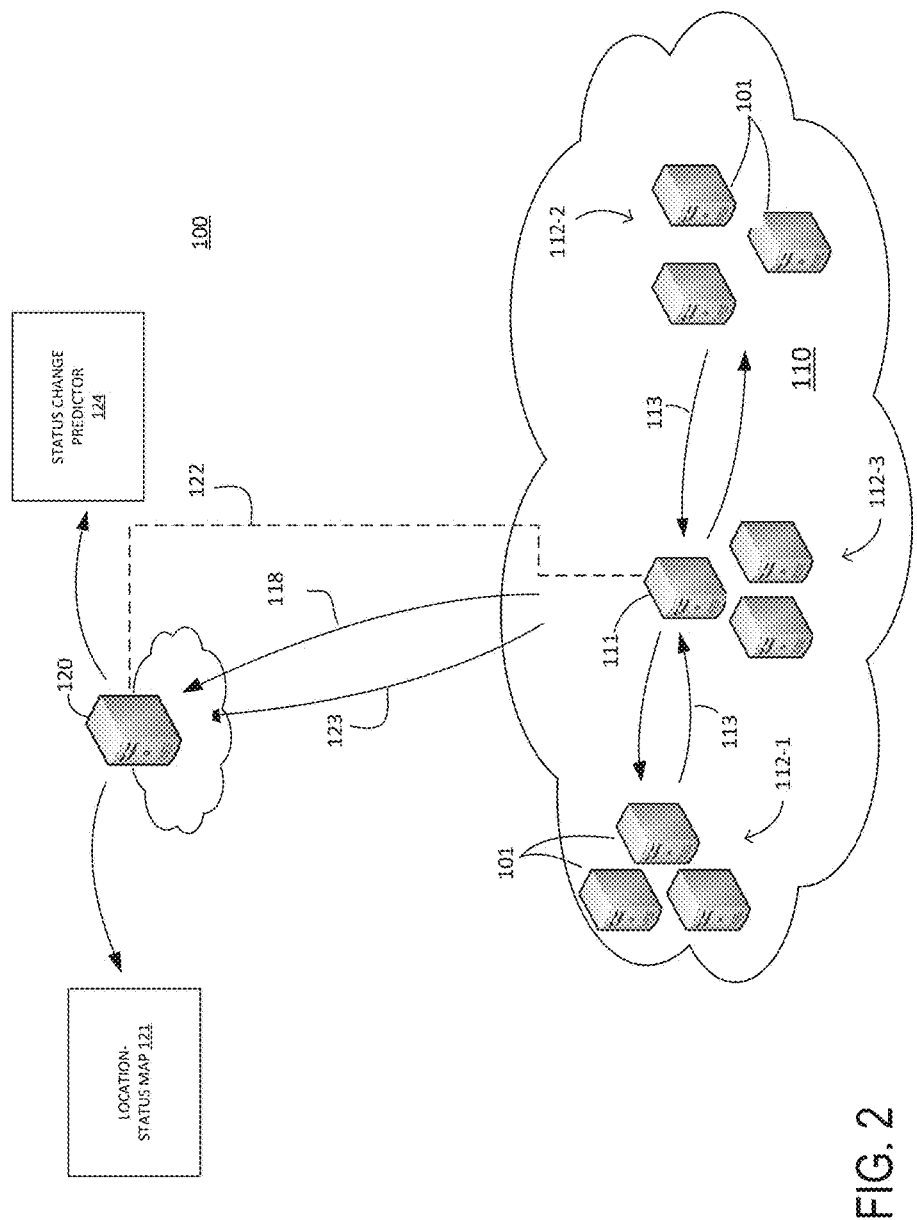
FIG. 2 illustrates the inclusion of location information within the information handling system platform of FIG. 1.

FIG. 2 illustrates information handling platform 100 including the use of location data 123 provided from server group 110. The location data 123 illustrated in FIG. 2 may be provided to remote management resource 120 in combination with the health status information 118 provided from server group 110 as described with respect to FIG. 1. FIG. 2 conveys that, by providing the remote management resource 120 with location data 123 in combination with health status information 118, remote management resource 120, or another resource accessible or otherwise coupled to remote management resource 120, may be configured to perform location-health operations, which may include any operation in which a relationship between location and health status is depicted or otherwise conveyed as well as operations in which the location-health status relationship influences the result produced by the operation.

Figure 3:
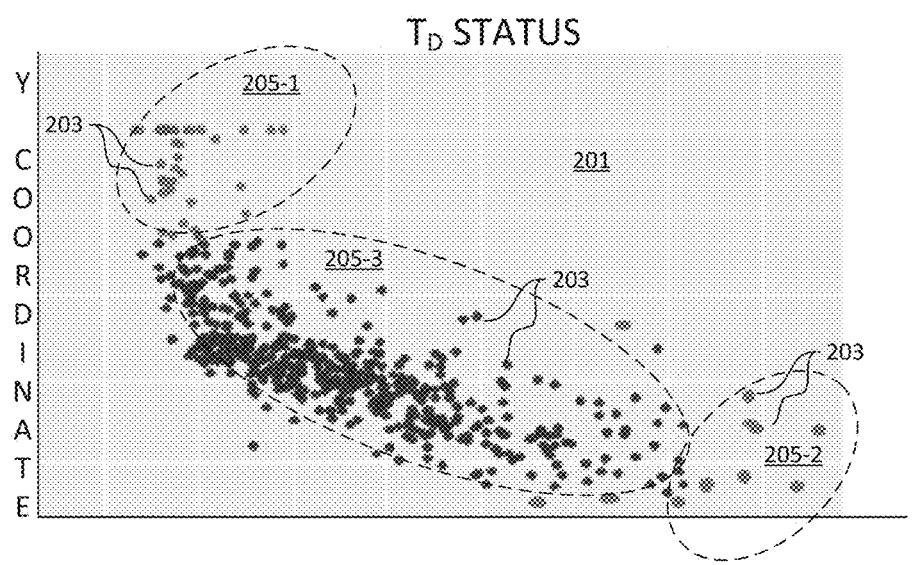
FIG. 3 illustrates a first location-status map.
Figure 4:
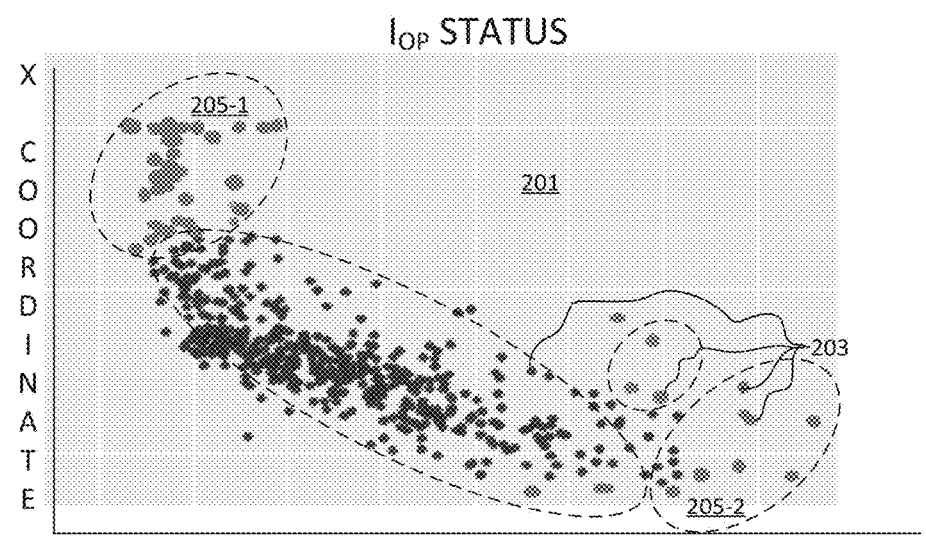
FIG. 4 illustrates a second location-status map.

Location-health status operations include as one example, location-status map operations that provide an administrator or other user with a location-status map, described with respect to FIG. 3 and FIG. 4, graphically illustrating status information for a particular parameter for each of the group members, whereby each data point in the maps is positioned within the map to reflect the absolute or relative location of the applicable group member.

Location-health status operations may further include the use of historical group status data and historical status change events, in which a status of one or more health parameters changes in one or more group members, to develop a status change predictor 124.

FIG. 3 illustrates a location-aware status map, referred to herein as location-status map 201, generated in accordance with at least some embodiments of information handling system platform 100. The location-status map 201 illustrated in FIG. 3 includes a plurality of data points 203, each of which corresponds to a group member 101 in the server group 110 of FIG. 1 and each of which indicates a status of the applicable group member 101 with respect to a particular health parameter.

The location-status map 201 illustrated in FIG. 3 conveys status of a group member 101 by the shape and color or shading of the applicable data point 203. Consistent with previously referenced embodiments of the health parameter states, the illustrated location-status map 201 employs three levels of status, i.e., three states, for the applicable health parameter. The three states into which each value of the applicable health parameter might be categorized include a normal state indicated by data points having a first shape and/or a first color (e.g., green), a warning state indicated by data points having a second shape and/or a second color (e.g., yellow), and a non-compliant or out-of-limit category indicated by data points having a third shape and/or a third color (e.g., red). When used in conjunction with a display or device that does not support color, the information conveyed by the colors may be conveyed using gray scale shading or another suitable technique.

Although FIG. 3 illustrates a location-status map 201 that includes three parameter states conveyed by square, diamond, and circular data points of green, yellow, and red (the colors are not explicitly conveyed by the gray shading of FIG. 3), other embodiments may employ more or fewer parameter states, different shapes, and different colors.

Although a location-status map 201 may represent any suitable health-status parameter, the location-status map 201 of FIG. 3 represents a thermal status of the parameter $T_D$ (device temperature) for each of the group members represented by a data point 203. The particular thermal parameter illustrated in FIG. 3 is an example, other thermal parameters may be used in other location-status maps. Thermal parameters that might be associated with location-status map 201 include, as non-limiting examples, ambient air temperature within a chassis of the applicable group member 101, a junction temperature of a particular chip or device, a fan output temperature corresponding to the temperature in proximity to a heat fan included in the chassis or any other suitable thermal parameter, at least some of which may be indicated by a temperature sensor and at least some of which may be estimated based on one or more sensed temperatures in combination with one or more other parameters.

In addition to conveying a status of a particular thermal parameter, the position of each data point 203 included in location-status map 201 conveys the site location x-y coordinates of the corresponding group member 101 (FIG. 1). In this manner, the illustrated location-status map 201 conveys the relative physical or geographic locations of the group members 101 represented by each data point 203. Thus, each data point 203 may be positioned within location-status map 201 according to the x-y coordinates of the application group member 101.

In at least one embodiment, the x-y coordinates may be determined or at least partially determined using a link level determination of distance from a fixed point such as the fixed point corresponding to group manager 111. In these embodiments, a link level parameter might include a response time required to ping a neighboring group member from the fixed point group member or a strength of a local wireless signal such as a BLE signal.

In at least some embodiments, the x-y coordinates indicating the relative physical location of group members can be derived from a set of attributes. These attributes may include latitude and longitude coordinates from GPS sensors, user-specified server location including, for example, latitude and longitude coordinates and any other indicator like building identification and floor identification if a server location topology does not preexist, at the time of onboarding. Information of this type may be leveraged by a suitable query entity that is aware of rack servers and capable of sharing their identifiers. The query entity may publish its services to the applicable group and the group's master node may subscribe to receive notifications from this service to identify server enclosures in the network. Other sources of information from which the relative location of a group member may be derived include proximity detection making use of a BLE stack and traceroute information reflecting traceroute response from group master to members.

By conveying health parameter status information and relative location information, location-status map 201 beneficially enables network administrators to recognize location-dependent health status traits of group members 101 in a server group 110. For example, the location-status map 201 of FIG. 3 illustrates a small concentration of data points 203 in region 205-1 exhibiting a borderline (yellow) status and a small concentration of data points 203 in region 205-2 exhibiting a non-compliant (red) status. The two corresponding regions 205 of location-status map 201 are located at opposite ends of a larger region 205-3 of normal status data points 203.

The location-status map 201 readily conveys the presence of two distinct issues with respect to the health parameter of interest. The group members corresponding to the data points 203 in first region 205-1 are clearly evidencing location-dependent behavior that is resulting in a moderate departure from normal operating conditions while the group members corresponding to the data points 203 in second region 205-2 are equally clearly evidencing location-dependent behavior that is resulting in an even greater departure from normal operating conditions. One of ordinary skill in the applicable field would appreciate that, in the absence of x-y coordinate data conveyed by location-status map 201, the distinction between the group members within region 205-1 and the group members within region 205-2 may have been more difficult to identify or overlooked entirely.

FIG. 4 illustrates a second example of a location-status map 201. The location-status map 201 of FIG. 4 conveys status information for a second health parameter, different than the first parameter represented in the location-status map 201 of FIG. 3. The second parameter may be, as a non-limiting example, any of various electrical parameters associated with the group members 101 corresponding to each data point 203. The electrical parameter represented in the location-status map 201 of FIG. 4 may be an operating current parameter, a voltage parameter, a power parameter, an impedance parameter, and so forth. Any of these parameters might be sensed and/or determined as a peak or average value over an interval of time or as an instantaneous value.

Again, as in the location-status map 201 of FIG. 3, by conveying the applicable health parameter with x-y coordinate information, the location-status map may convey behavior that correlates strongly with the location or x-y coordinate information, thereby facilitating a better understanding of the nature of any given condition and promoting a more appropriate course of action or courses of action. In the location-status map 201 of FIG. 4, for example, an administrator might take a particular action with respect to the data points 203 in region 205-2 while taking no action or a different action with respect to the data points 203 in region 205-1 even though data points in both regions 205 may indicate behavior that is "out of normal."

In conjunction with the ability to convey x-y coordinate information, at least some embodiments of the information handling system platform 100 of FIG. 1 beneficially includes features for determining relative x-y coordinates of group members within a server group 110 or within any other suitable identifiable collection of servers or other systems.

Figures 5, 6, 7:
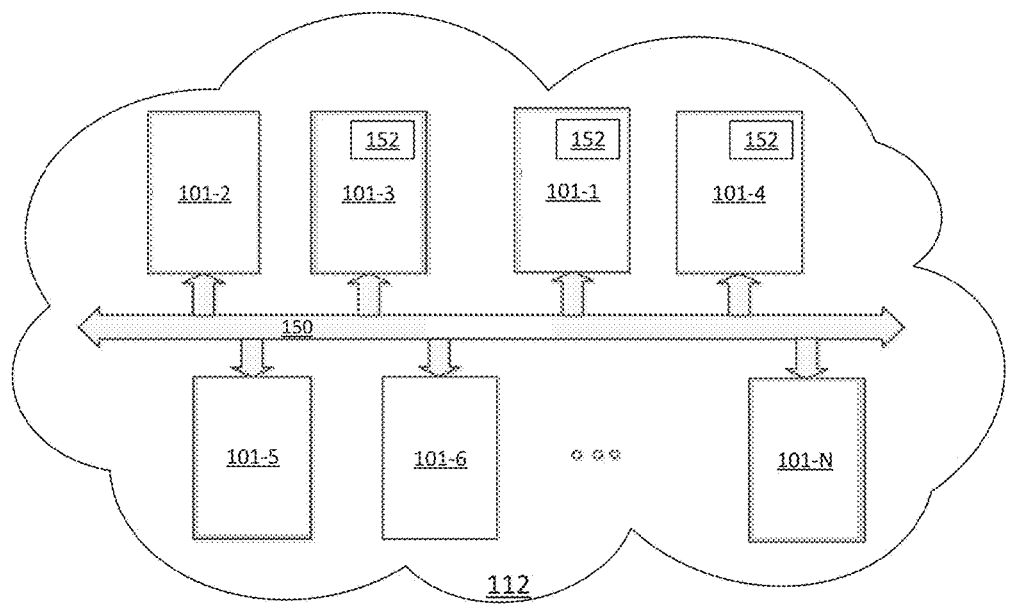
FIG. 5 illustrates a server group segment including a link local connection.
FIG. 6 illustrates first data for resolving the relative locations of members in the server group of FIG. 1.
FIG. 7 illustrates second data for resolving the relative locations of members in the server group of FIG. 1.

In an embodiment represented in FIG. 5, FIG. 6, AND FIG. 7, the group members 101 within a group segment 112 of the server group 110 illustrated in FIG. 1 and FIG. 2 may be configured to determine relative location information using link level hardware and/or link level signaling. The illustration of group segment 112 represented in FIG. 5 emphasizes a link level connection 150 among the group members 101 within group segment 112.

In at least one embodiment, one or more individual group members 101 within group segment 112 include a proximity determination module 152 configured to determine proximity based upon one or more indirect measures of proximity that may be apparent to or detected by group members 101 within a particular group segment 112. The link level connection 150 may represent a local area network (LAN) to which each of the group segment group members 101 are directly connected, e.g., the group members 101 that have unique network addresses on local link 150. Alternatively, the local link connection 150 illustrated in FIG. 5 may represent a wireless link that encompasses group members 101 connected to a common wireless access point not explicitly depicted in FIG. 5.

FIG. 6 and FIG. 7 illustrate tables of proximity information that may be determined by one or more of the group members 101 within a particular group segment 112. The table 160 illustrated in FIG. 6 indicates a ping response time for every combination of group members represented in the horizontal and vertical axes. Although FIG. 6 illustrates just three group members 101 (A, B, and C), it will be readily appreciated that table 160 may include substantially any number of group members.

The table 160 of ping response times between the indicated pairs of group members may be determined by two or more of the group members 101 acting in a coordinated fashion to provide the applicable ping response time data, or any other suitable proximity parameter. In at least one embodiment, each group member 101 may include functionality to identify other group members 101 within its server group 110 and to initiate a ping with respect to any one or more of the other group members. In one embodiment, each group member 101 of a server group 110 may ping each other group member such that, for any pair of group members 101, at least two measurements of the proximity between them is generated. Other embodiments may attempt to determine proximity based upon a single measurement of ping response or other parameter for each unique pair of group members 101.

At a link local level, ping response time may provide a suitably accurate measure of proximity, which may be used to resolve the relative locations of group members 101 within a group segment 112. This ability may extend to other facilities or resources that may be leveraged for determining or indicating proximity between group members within server group 110. Other capabilities may include, as examples, GPS capabilities that one or more group members 101 may include, although GPS features may be of no or limited use with respect to group members 101 that are located indoors, i.e., group members that do not have line of sight with orbiting GPS satellites.

FIG. 7 illustrates a table 170 of proximity information corresponding to a Bluetooth Low Energy (BLE) signal associated with a wireless access point with which each of the applicable group members A, B, and C may communicate. Whereas the ping response time indicated in table 160 of FIG. 6 was reported as a value, in milliseconds, the BLE signal strength represented in table 170 has been quantized or categorized into one of a set of values that includes "near" and "immediate."

Using the proximity information inherent in the ping response times of table 160 or other BLE signal strengths in table 170, proximity determination modules 152 may be able to resolve x-y coordinate information suitable for use in conjunction with a location-status map 201 such as depicted in FIG. 3 and FIG. 4. In some embodiments, two or more proximity parameters may be used in combination by proximity determination modules 152 to better determine x-y coordinates of the applicable group members. The BLE signal strength indicated in table 170 of FIG. 7, as an example, may be used to interpret or refine information obtained from table 160 of FIG. 6. Where table 160 indicates substantially the same ping-based proximity, 1 ms, between group member B and group member A, table 170 of FIG. 7 indicates that group members B and C are closer together than group members B and A based on BLE signal strength. By iterating thru the relative location information for all group members, x and y coordinates suitable for use in constructing location-status maps such as the location-status maps 201 illustrated in FIG. 3 and FIG. 4 may be determined.

Illustrating this process using the example data in table 160 of FIG. 6 and table 170 of FIG. 7 for a hypothetical three-member group comprising systems A, B, and C, such a process might begin by examining and comparing the entries in "row A" of each table. The data in columns B and C of Row A in table 160 indicates that the distance between systems A and B is less than the distance between systems B and C, based on the 1 ms ping response time between systems A and B versus the 2 ms ping response time between systems A and C. This conclusion is supported when the entries in columns B and C of row A in table 170 of FIG. 7 are compared, where system B has an "immediate" signal strength relative to system A and system C has a "Near" signal strength relative to system A.

The process may then determine that system A is furthest from system C based on a comparison of columns A and B of row C in tables 160 and 170, indicating that, with respect to system C, system A has the weaker BLE signal strength (near vs. Near) and the slower ping response time (2 ms v. 1 ms). From this information, the process may then recognize that system B is the closest system to system C and this conclusion may be supported based on system B's shortest ping response time and BLE signal strength. In this example, based on a set of six computationally trivial comparisons, the process has resolved that AB<BC<AC where AB represents the distance between systems A and B, etc.

The process could then begin to create an x-y map by arbitrarily assigning one of the systems, e.g., system A, to the x-y origin or to another fixed coordinate pair. A first circle may then be drawn around the origin system to represent the possible positions of one of the other two systems, e.g., system B, where the radius of the circle is estimated based upon the ping response time, the BLE signal strength, or a combination thereof. Using a radius of 1 unit for 1 ms of ping response time, the system B circle would have a radius of 1 and the system C circle would have a radius of 2. To account for various sources of error and/or distortion, a pair of circles might be drawn for each system, one with a radius of R+d and a second with a radius of R−d, where R reflects the ping/BLE-based radius estimation and d represents an error margin. Using this approach, the resulting set of possible position of system B relative to system A resembles a Saturn-like ring of thickness 2*d at a median radius of 1 with system A at its center. A similar ring can then be drawn for system C where the system C ring has a greater radius and may, depending on the model used, have a greater value of d, the error margin, than the error value for system B. When this process or an analogous process is scaled to accommodate a larger number of systems and iterated thru each system-pair combination, a set of relative physical x/y locations may be generated.

In the context of a server group 110, proximity determination modules 152 may be invoked by group manager 111 executing a program for resolving x-y coordinate data. Such a program may store x-y coordinate data in a corresponding data structure for use in conjunction with health parameter information.

Figure 8:
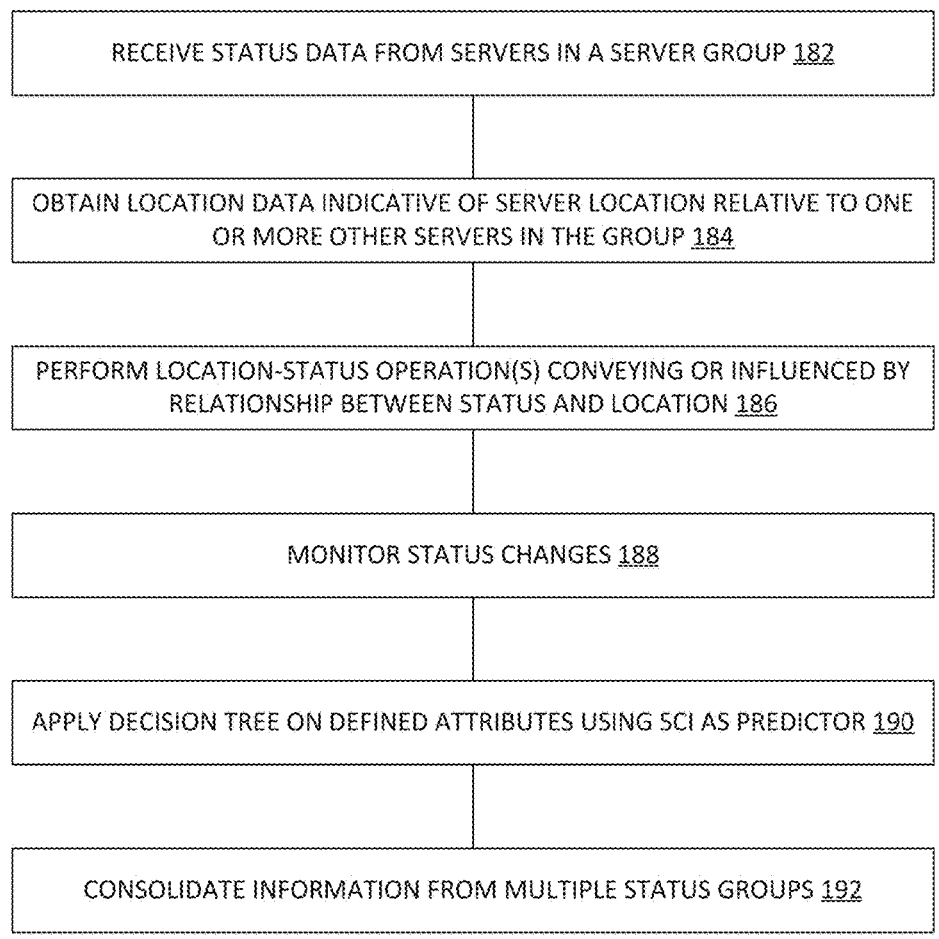
FIG. 8 illustrates a method for managing a server group.

FIG. 8 illustrates a method 180 for managing a group of information handling systems 101 suitable for use as group members 101 of a server group 110.

The illustrated method 180, which may represent operations performed by group manager 111 (FIG. 1), remote management resource 120 (FIG. 1) or by another suitable resource or combination of resources, includes receiving (operation 182) health status data from servers or other information handling systems in a server group 110. The health status data may include, as previously suggested, data associated with or indicative of a thermal/temperature parameter, an electrical parameter such as a power, current, voltage, or impedance, or capacitance parameter, or functional or performance parameter. As examples of the latter, embodiments of method 180 may receive health status data indicating a network latency or delay associated with the applicable group member, an error rate associated with a group member, an available bandwidth or processing capability, and so forth.

The method 180 illustrated in FIG. 8 further includes obtaining (operation 184) location data indicative of server location relative to one or more other servers in the server group. As discussed above with respect to FIGS. 5, 6, and 7, location data may be determined using a local link connection in conjunction with proximity determination techniques that provide direct or indirect determinations of proximity or physical distance. In addition, local link proximity data may be supplemented with other types of location data including GPS data where applicable, user provided information including, as an example, implementations of a group manager resource and/or a remote management resource that enable users to indicate values for one or more location position parameters.

The method 180 illustrated in FIG. 8 further includes performing (operation 186) one or more location-status operations that convey or are influenced by a relationship between health status and location of an information handling system within a server group or another collection of multiple information handling systems. The generation of a location-status map such as the location-status maps 201 of FIG. 3 and FIG. 4 represent a locations-status operation that may be included in method 180.

Location-status operations may also include processing information provided via snapshots 121 (FIG. 1) to collect data that can be consumed for failure heuristics. For example, group manager 111 may respond to receiving or otherwise detecting (block 188) a change in the health parameter status of any one or more systems with respect to any one or more health parameters monitored. Status changes may include, any change from previous snapshot, including the following status changes for implementations that employ three states, GREEN, YELLOW, and RED, for a particular health parameter: YELLOW-to-GREEN, GREEN-to-YELLOW, RED-to-YELLOW, YELLOW-to-RED, RED-to-UNAVAILABLE, YELLOW-to-UNAVAILABLE, and UNAVAILABLE-to-AVAILABLE.

Upon detecting a status change, a server may collect time stamp, server identifier, system health status, encompassing multiple health status attributes, voltage consumption information encompassing multiple power consumption components, and thermal statistics encompassing multiple thermal parameters. The module may further maintain a binary indicator of whether a change in health status is positive, e.g., RED-to-YELLOW or YELLOW-to-GREEN or negative GREEN-to-YELLOW, YELLOW-to-RED.

The binary health status change indicator may be used as a target variable for predictive heuristics. A decision tree method may then be applied (block 190) to make predictions regarding system health status attributes including voltage consumption attributes, or thermal level attributes using the binary indicator as a predictor.

In at least one embodiment, preprocessed information from a plurality of server groups 110 may be consolidated (block 192) to form group-of-group (GoG) data that may be harvested, e.g., by a cloud-based master component. By representing a wider set of data samples, the GoG data may beneficially produce better heuristics and more accurate failure predictions. In addition, the GoG data may be made available to a dedicated and powerful server to support computationally intensive learning, classification, and regression techniques such as random decision forests.

Figure 9:
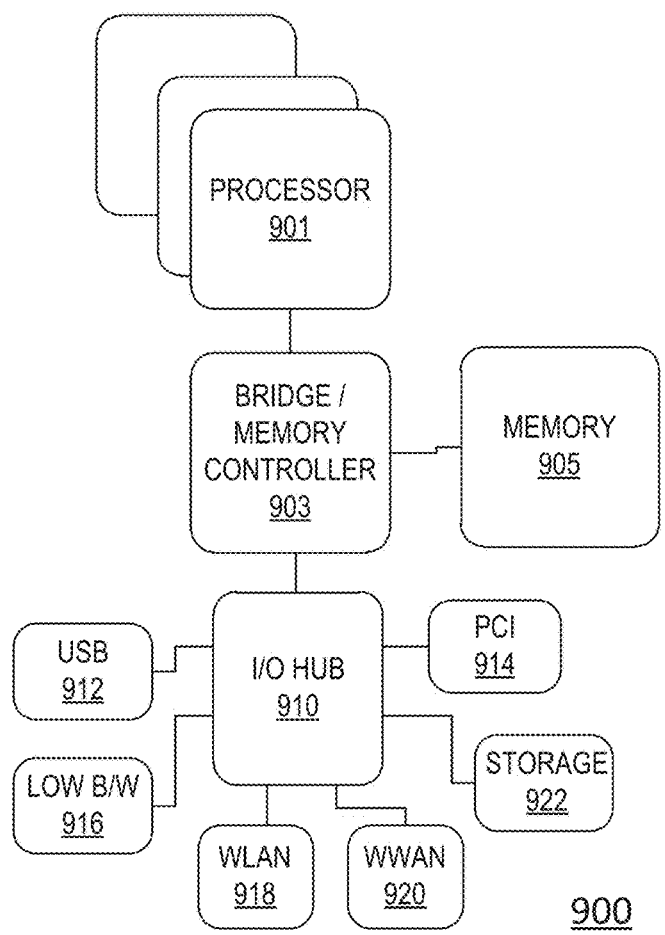
FIG. 9 illustrates an information handling system.

FIG. 9 illustrates elements of an information handling system 900 that may be suitable for use as group member 101 or another server 111 illustrated in FIG. 1 and FIG. 2. The information handling system 900 illustrated in FIG. 9 includes one or more general-purpose processors 901 coupled to a bridge/memory controller 903. Bridge/memory controller 903 controls a memory 905 and communicates with an I/O hub 910. The I/O hub 910 of the information handling system 900 illustrated in FIG. 9 supports a diverse set of I/O controllers and adapters.

The I/O hub 910 of FIG. 9 includes a USB controller 912 for high-speed serial communication, a PCI controller 914 for communication with PCI devices, and a low bandwidth controller 916 for providing low bandwidth protocols including, as examples, LPC, SPI, and I2C. A WLAN controller 918 provides support for various local and personal area network protocols including, as non-limiting examples, Wi-Fi, Bluetooth, and Zigbee while a WWAN controller 920 provides support for GSM and/or CDMA communication. The information handling system 900 of FIG. 9 further includes a storage adapter 922 that supports one or more mass storage protocols including, as examples, SCSI, SATA, and NVMe. Any of the elements shown in FIG. 9 may encompass two or more distinct controllers or adapters. Conversely, any group of two or more elements shown separately in FIG. 9 may be integrated within a single semiconductor device, chip set, or printed circuit board.

Although the information handling system 900 of FIG-URE does not expressly indicate conventional human I/O adapters and controllers including video/graphics adapters, keyboard, mouse, and touchpad controllers, microphone and speaker transducers, or an audio codec, other embodiments of information handling system 900 may include any or all of these elements.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of managing a server group comprising a plurality of members, wherein each the plurality of members comprises an information handling system, the method comprising:
   obtaining, a member-pair proximity value for each unique pair of members in the server group, wherein each member-pair proximity value is determined based on a connectivity parameter selected from a group of parameters comprising: a ping response delay between a pair of members and a strength of a wireless signal between the pair of members;
   determining a member-pair distance for each member-pair proximity value, wherein each member-pair distance indicates a distance between a corresponding pair of the plurality of members;
   determining, from the member-pair distances, location data indicative of relative locations of each of the plurality of members of the server group;
   receiving and recording, from time to time, status data from each of the plurality of members of the server group, wherein the status data indicates a state of an operational parameter of a member, wherein the state is a dimensional parameter selected from two or more possible states, wherein the possible states include a normal state and a non-compliant state;
   identifying, from the location data and the status data, a locational dependency of the operational parameter;
   responsive to identifying the locational dependency, performing a group operation to convey the location dependency;
   responsive to detecting a status change event corresponding to a change in the status data from one or more of the plurality of members, recording status change data, wherein the status change data indicates whether the status change event corresponds to a positive status change or a negative status change;
   based on the status data, including current status data and historical status data, and the status change data, including current status change data and historical status change data, determining a predicted next status change; and
   based on the predicted next status change, performing a corrective action.

2. The method of claim 1, wherein performing the group operation includes:
   generating a location-status display including, for each of the plurality of members, a data point visually indicating the state of the operational parameter and a location of the member relative to each of the other members.

3. The method of claim 2, further comprising:
   recording, from time to time, a location-status snapshot indicative of the location status display.

4. The method of claim 3, further comprising:
   monitoring for a status change corresponding to a change of health parameter status of a group member; and
   maintaining status change information including information indicative of whether the status change was positive or negative; and
   predicting a next change of status change indicator based on the status change information and a current state of the group member.

5. The method of claim 1, wherein the operational parameter comprises an operational parameter corresponding to sensor data received from a sensor of the member.

6. The method of claim 5, wherein the operational parameter comprises a temperature parameter corresponding to a temperature associated with the member, wherein the temperature is selected from: ambient air temperature within a chassis of the member, a junction temperature of a particular chip or device within the member, and a fan output temperature corresponding to the temperature in proximity to an air moving fan of the member.

7. The method of claim 5, wherein the operational parameter is an electrical parameter selected from: a power consumption parameter, an electrical current parameter, a voltage parameter, and an impedance parameter.

8. The method of claim 1, wherein the connectivity parameter comprises a strength of a personal area network signal between the pair of members.

9. The method of claim 8, wherein the personal area network signal is selected from: a Bluetooth signal and a Bluetooth Low Energy signal.

10. The method of claim 1, further comprising:
    consolidating status data from a plurality of distinct server groups to obtain group-of-groups data; and harvesting, by a cloud-based master resource, the group-of-groups data.

11. An information handling system, comprising:
a processor; and
a computer readable medium, coupled to the processor, including processor executable instructions that, when executed, cause the processor to perform operations including:
obtaining a member-pair proximity value for each unique pair of members in the server group, wherein each member-pair proximity value is determined based on a connectivity parameter selected from a group of parameters comprising: a ping response delay between a pair of members and a strength of a wireless signal between the pair of members;
determining a member-pair distance for each member-pair proximity value, wherein each member-pair distance indicates a distance between a corresponding pair of the plurality of members;
determining, from the member-pair distances, location data indicative of relative locations of each of the plurality of members of the server group;
receiving and recording, from time to time, status data from each of the plurality of members of the server group, wherein the status data indicates a state of an operational parameter of a member, wherein the state is a dimensional parameter selected from two or more possible states, wherein the possible states include a normal state and a non-compliant state;
identifying, from the location data and the status data, a locational dependency of the operational parameter;
responsive to identifying the locational dependency, performing a group operation to convey the location dependency;
responsive to detecting a status change event corresponding to a change in the status data from one or more of the plurality of members, recording status change data, wherein the status change data indicates whether the status change event corresponds to a positive status change or a negative status change;
based on the status data, including current status data and historical status data, and the status change data, including current status change data and historical status change data, determining a predicted next status change; and
based on the predicted next status change, performing a corrective action.

12. The information handling system of claim 11, wherein performing the group operation includes:
generating a location-status display including, for each of the plurality of members, a data point visually indicating the state of the operational parameter and a location of the member relative to each of the other members.

13. The information handling system of claim 12, wherein the operations include:
recording, from time to time, a location-status snapshot indicative of the location-status display.

14. The information handling system of claim 13, wherein the operations include:
monitoring for a status change corresponding to a change of health parameter status of a group member; and
maintaining status change information including information indicative of whether the status change was positive or negative; and
predicting a next change of status change indicator based on the status change information and a current state of the group member.

15. The information handling system of claim 11, wherein the operational parameter comprises a temperature parameter corresponding to a temperature associated with the member, wherein the temperature is selected from: ambient air temperature within a chassis of the member, a junction temperature of a particular chip or device within the member, and a fan output temperature corresponding to the temperature in proximity to an air moving fan of the member.

16. A non-transitory computer readable storage medium, comprising processor executable instructions that, when executed, cause a processor to perform operations including:
obtaining a member-pair proximity value for each unique pair of members in the server group, wherein each member-pair proximity value is determined based on a connectivity parameter selected from a group of parameters comprising: a ping response delay between a pair of members and a strength of a wireless signal between the pair of members;
determining a member-pair distance for each member-pair proximity value, wherein each member-pair distance indicates a distance between a corresponding pair of the plurality of members;
determining, from the member-pair distances, location data indicative of relative locations of each of the plurality of members of the server group;
receiving and recording, from time to time, status data from each of the plurality of members of the server group, wherein the status data indicates a state of an operational parameter of a member, wherein the state is a dimensional parameter selected from two or more possible states, wherein the possible states include a normal state and a non-compliant state;
identifying, from the location data and the status data, a locational dependency of the operational parameter;
responsive to identifying the locational dependency, performing a group operation to convey the location dependency;
responsive to detecting a status change event corresponding to a change in the status data from one or more of the plurality of members, recording status change data, wherein the status change data indicates whether the status change event corresponds to a positive status change or a negative status change;
based on the status data, including current status data and historical status data, and the status change data, including current status change data and historical status change data, determining a predicted next status change; and
based on the predicted next status change, performing a corrective action.

17. The computer readable medium of claim 16, wherein the operational parameter is an electrical parameter selected from: a power consumption parameter, an electrical current parameter, a voltage parameter, and an impedance parameter.

18. The computer readable medium of claim 16, wherein the connectivity parameter comprises a strength of a personal area network signal between the pair of members.

19. The computer readable medium of claim 18, wherein the personal area network signal is selected from: a Bluetooth signal and a Bluetooth Low Energy signal.

20. The computer readable medium of claim 16, wherein the operations include:
consolidating status data from a plurality of distinct server groups to obtain group-of-groups data; and harvesting, by a cloud-based master resource, the group-of-groups data.

\* \* \* \* \*